(12) United States Patent
Paik et al.

(10) Patent No.: US 7,453,530 B2
(45) Date of Patent: Nov. 18, 2008

(54) LIQUID CRYSTAL DISPLAY DEVICE

(75) Inventors: Sang Yoon Paik, Seoul (KR); Joon Youp Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 305 days.

(21) Appl. No.: 11/295,447

(22) Filed: Dec. 7, 2005

(65) Prior Publication Data

US 2006/0290826 A1  Dec. 28, 2006

(30) Foreign Application Priority Data

Jun. 23, 2005  (KR) ..................... 10-2005-0054624

(51) Int. Cl.
G02F 1/1343  (2006.01)
(52) U.S. Cl. ........................................ 349/38; 349/141
(58) Field of Classification Search ................ 349/141, 349/38
See application file for complete search history.

(56) References Cited

U.S. PATENT DOCUMENTS

2002/0060769 A1 *  5/2002  Komatsu ..................... 349/141
2004/0218131 A1 *  11/2004  Kim et al. ................... 349/141
2006/0125989 A1 *  6/2006  Park et al. ................... 349/141

* cited by examiner

Primary Examiner—David C. Nelms
Assistant Examiner—Thanh-Nhan P Nguyen
(74) Attorney, Agent, or Firm—Birch, Stewart, Kolasch & Birch, LLP

(57) ABSTRACT

A liquid crystal display device includes a thin film transistor formed on a substrate, the thin film transistor including a gate electrode; a gate insulation film formed on the gate electrode and the substrate; and a storage capacitor connected to the drain electrode, the storage capacitor being above the gate insulation film.

30 Claims, 4 Drawing Sheets

LIQUID CRYSTAL DISPLAY DEVICE

This Nonprovisional Application claims priority under 35 U.S.C. §119(a) on Patent Application No. 10-2005-0054624 filed in Korea on Jun. 23, 2005, the entire contents of which are hereby incorporated by reference.

BACKGROUND OF THE INVENTION

1. Field of the Invention

The present invention relates to a liquid crystal display device, and more particularly, to an in-plane switching mode liquid crystal display device, the storage capacitance of which is increased so as to minimize the aperture ratio due to the area of a storage capacitor electrode.

2. Discussion of the Related Art

A liquid crystal display device, which is one of widely used flat panel display devices, is a device including a liquid crystal having the fluidity of a liquid and the optical properties of a crystal wherein an electric field is applied to the liquid crystal to change optical anisotropy of the liquid crystal. The power consumption of the liquid crystal display device is lower than that of a conventional cathode ray tube, and the size of the liquid crystal display device is less than that of the conventional cathode ray tube. Furthermore, the liquid crystal display device can be manufactured in large size and high definition. Consequently, the liquid crystal display device is widely used.

Based on the properties of a liquid crystal and the structure of a pattern, liquid crystal display devices may be constructed in various different modes.

Specifically, liquid crystal display devices are classified into a twisted nematic (TN) mode liquid crystal display device, a multi-domain mode liquid crystal display device, an optically compensated birefringence (OCB) mode liquid crystal display device, an in-plane switching mode liquid crystal display device, and a vertical alignment mode liquid crystal display device. In a twisted nematic (TN) mode liquid crystal display device, liquid crystal directors are arranged such that the liquid crystal directors are twisted 90 degrees, and a voltage is applied to the liquid crystal directors to control the liquid crystal directors. In a multi-domain mode liquid crystal display device, a pixel is divided into several domains, and directions of main viewing angles of the respective domains are changed to accomplish a wide viewing angle. In an optically compensated birefringence (OCB) mode liquid crystal display device, a compensating film is attached to the outer circumferential surface of a substrate to compensate for the phase change of light depending upon the path of the light. In an in-plane switching mode liquid crystal display device, two electrodes are formed on a substrate such that liquid crystal directors are twisted on the even plane of an alignment film. In a vertical alignment mode liquid crystal display device, a negative liquid crystal and a vertical alignment film are disposed such that the major axis of a liquid crystal molecule is aligned vertically to the plane of the alignment film.

The in-plane switching mode liquid crystal display device generally comprises a color filter array substrate and a thin film transistor array substrate, which are opposite to each other. Between the color filter array substrate and the thin film transistor array substrate is disposed a liquid crystal layer.

On the color filter array substrate are formed a black matrix for preventing light leakage and an RGB color filter layer for realizing colors on the black matrix.

On the thin film transistor array substrate, are formed gate lines and data lines, by which each pixel unit is defined, a switching element at the intersection between the gate lines and the date lines, and common electrodes and pixel electrodes, which are alternately arranged to generate a transversal electric field.

A conventional in-plane switching mode liquid crystal display device will be described with reference to the accompanying drawings.

FIG. 1 is a plan view illustrating a pixel unit of the conventional in-plane switching mode liquid crystal display device, and FIG. 2 is a cross-sectional view taken along line I-I' of FIG. 1.

As shown in FIGS. 1 and 2, the conventional in-plane switching mode liquid crystal display device includes a thin film transistor array substrate having a plurality of gate lines 12 arranged in line and a plurality of data lines 15 intersecting at right angles to the gate lines 12. Each pixel unit is defined by the gate line 12 and the data line 15. At each pixel unit are disposed a thin film transistor (TFT) serving as a switching element, a plurality of common electrodes 24 arranged parallel with the data lines 15, and a plurality of pixel electrodes 17 arranged parallel with the common electrodes 24. The pixel electrodes 17 are disposed between the common electrodes 24 such that the pixel electrodes 17 and the common electrodes 24 are alternately arranged.

The common electrodes 24 are connected to a common line 25 via a second contact hole 82 such that a Vcom signal is transmitted to the common electrodes 24 from an external drive circuit.

One end of each of the pixel electrodes 17 is integrally connected to each other. The integrally connected ends of the pixel electrodes 17 are connected to a drain electrode 15b of the thin film transistor (TFT) via a first contact hole 81 such that a pixel signal is transmitted to the pixel electrodes 17.

The common lines 25 and the gate lines 12 are made of a opaque low-resistance metal material. The common lines 25 and the gate lines 12 are formed on the same layer of the substrate. The data lines 15 are formed above the common lines 25 and the gate lines 12 while a gate insulation film 13 is disposed between the data lines 15 and the gate lines 12. The pixel electrodes 17 and the common electrodes 24 are formed on the same layer above the data lines 15 while a protective film 16 is disposed between the pixel electrodes 17 and the data lines 15. The pixel electrodes 17 and the common electrodes 24 are made of a transparent conductive material, such as indium tin oxide (ITO). The structure in which the pixel electrodes 17 and the common electrodes 24 are formed of the transparent conductive material, such as ITO, is referred to as an ITO-ITO electrode structure.

In this case, a storage capacitor is further provided to maintain electric charge applied in the liquid crystal at the turnoff section of the thin film transistor to prevent deterioration of the image quality due to the parasitic capacitor. In the case of the ITO-ITO structured in-plane switching mode liquid crystal display device, as shown in FIG. 2, a predetermined portion of the common line 25 serves as a lower capacitor electrode 90, and predetermined portions of the pixel electrodes 17 overlapping with on the lower capacitor electrode 90 serve as an upper capacitor electrode 91. The gate insulation film 13 and the protective film 16 disposed between the common line 25 and the pixel electrode 17 serve as an insulation film between the capacitor electrodes. In this way, a storage capacitance Cst is formed. The lower capacitor electrode is formed of an opaque layer. Therefore, the aperture ratio is decreased due to the large area of the opaque layer.

Recently, a larger number of pixel sections have been formed at the in-plane switching mode liquid crystal display device although the size of the liquid crystal panel is fixed.

Consequently, the resolution of the thin film transistor liquid crystal display device has increased, and therefore, the size of a pixel unit section has decreased. However, the area of the capacitor electrode for forming the storage capacitor is not reduced. As a result, the aperture ratio of the pixel unit section is decreased due to the relatively large opaque capacitor electrode.

SUMMARY OF THE INVENTION

Accordingly, the present invention is directed to an in-plane switching mode liquid crystal display device that substantially obviates one or more problems due to limitations and disadvantages of the related art.

An object of the present invention is to provide a liquid crystal display device including a storage capacitor, which comprises either of an extension of a drain electrode (a lower capacitor electrode) and an extension of a common electrode (an upper capacitor electrode), and a thin protective film disposed between the lower capacitor electrode and the upper capacitor electrode. Therefore, the storage capacitance is increased, and the area of the capacitor electrode is reduced because of the increment of the storage capacitance. Accordingly, the aperture ratio of the liquid crystal display device is improved.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device comprises: a thin film transistor formed on a substrate, the thin film transistor including a drain electrode; and a storage capacitor connected to the drain electrode, the storage capacitor including: a lower capacitor electrode extending from the drain electrode; an upper capacitor electrode; and a protective film between the lower capacitor electrode and the upper capacitor electrode.

In another aspect of the present invention, a liquid crystal display device comprising: a thin film transistor formed on a substrate, the thin film transistor including a drain electrode; and a storage capacitor connected to the drain electrode, the storage capacitor including: a lower capacitor electrode; an upper capacitor electrode extending from at least one common electrode; and a protective film between the lower capacitor electrode and the upper capacitor electrode.

In still another aspect of the present invention, a liquid crystal display device comprising: a thin film transistor formed on a substrate, the thin film transistor including a gate electrode; a gate insulation film formed on the gate electrode and the substrate; and a storage capacitor connected to the drain electrode, the storage capacitor being above the gate insulation film.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

An in-plane switching mode liquid crystal display device according to an embodiment of the present invention will be described in detail hereinafter with reference to the accompanying drawings.

Figure 1:
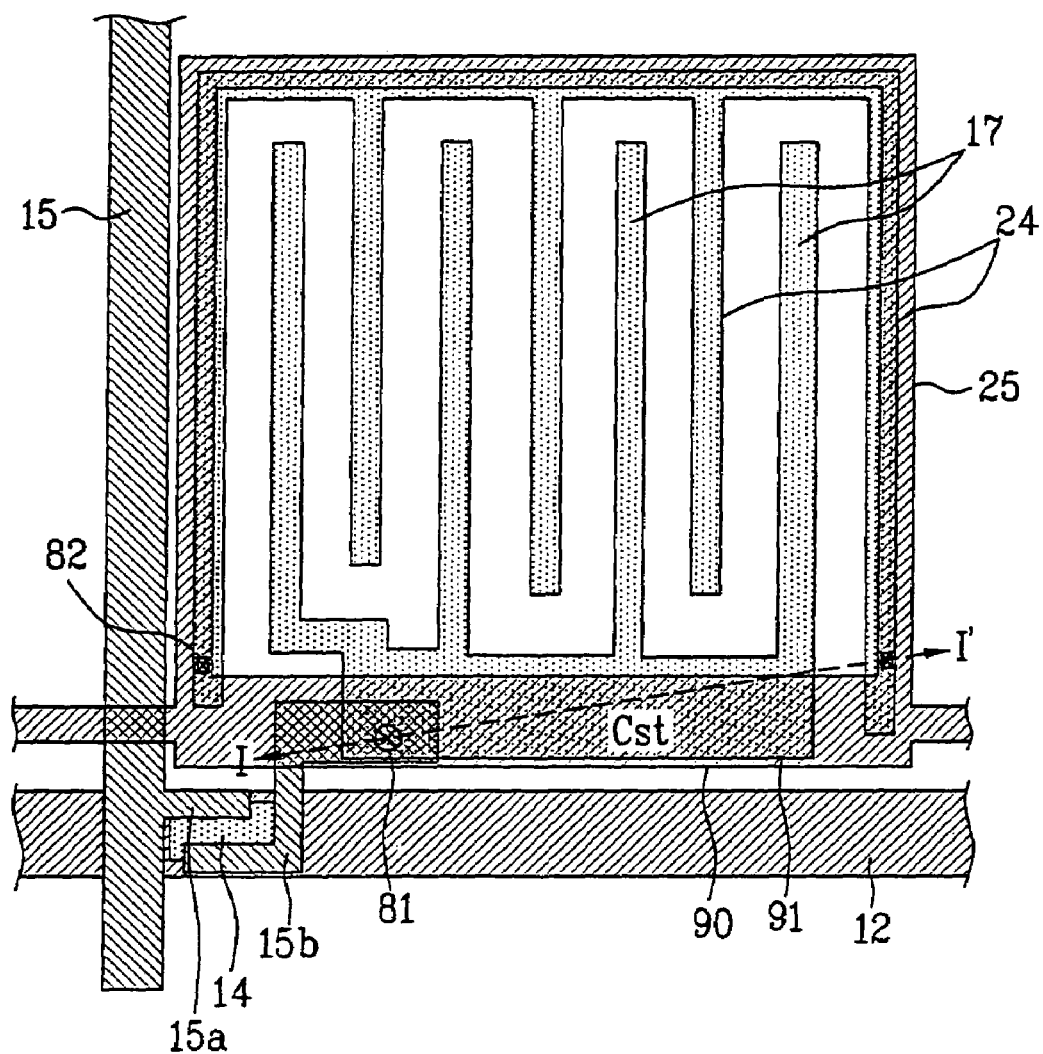
FIG. 1 is a plan view illustrating a pixel unit of a conventional in-plane switching mode liquid crystal display device.
Figure 2:
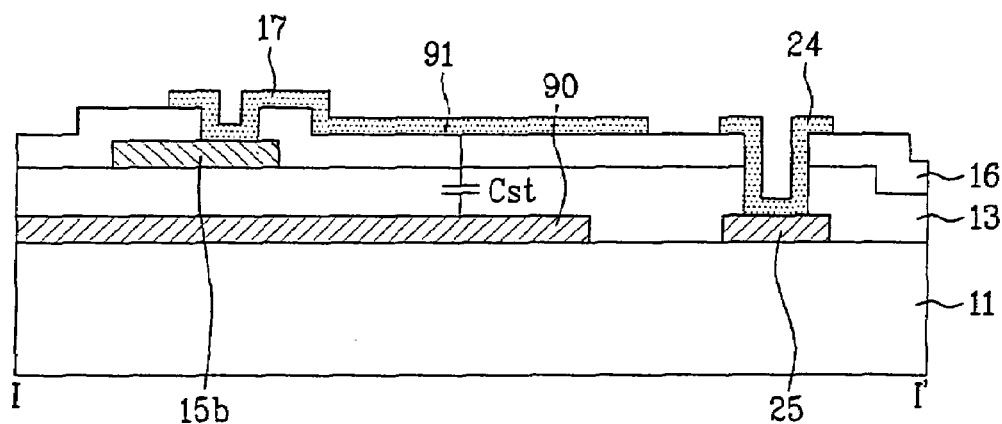
FIG. 2 is a cross-sectional view taken along line I-I' of FIG. 1.
Figure 3:
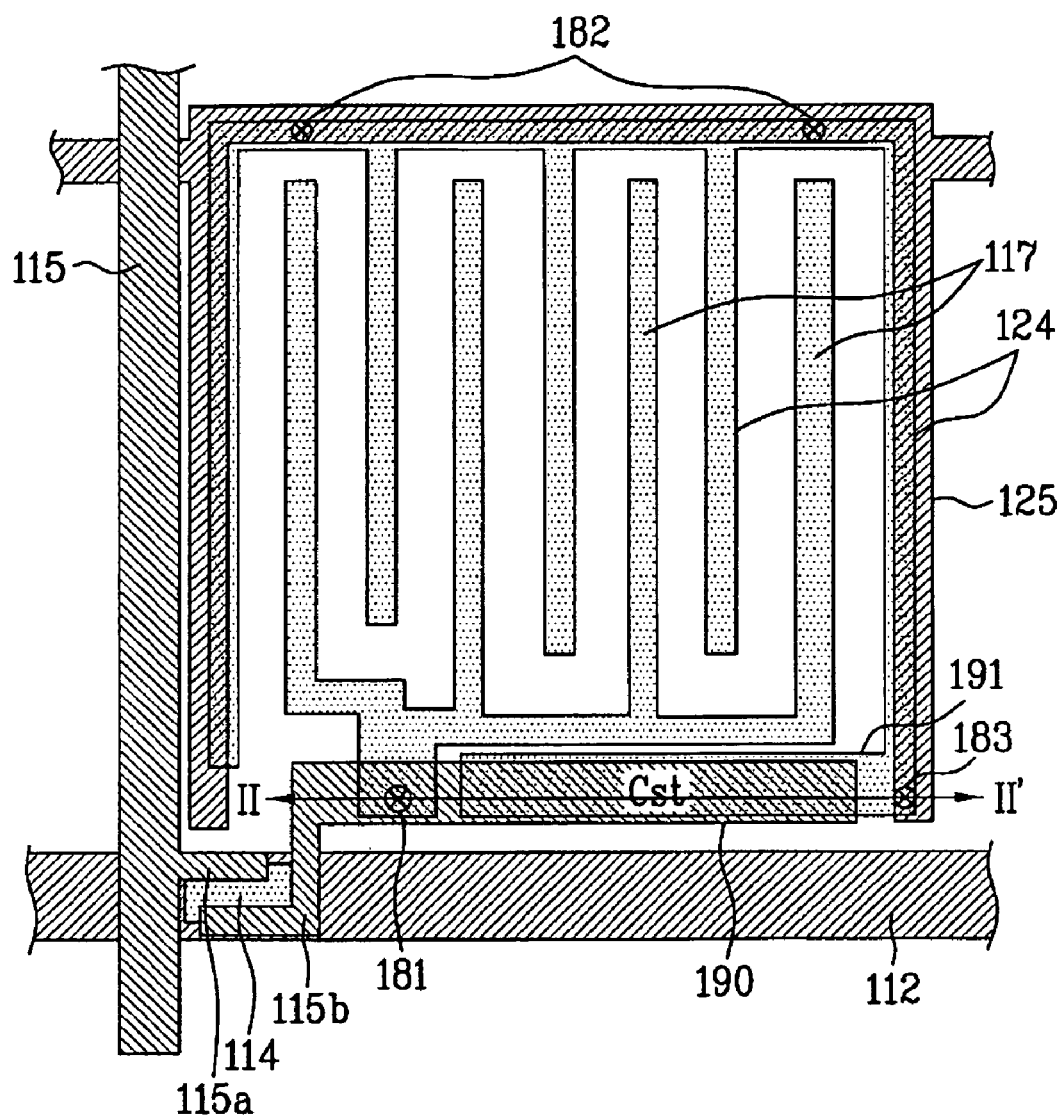
FIG. 3 is a plan view illustrating a pixel unit of an in-plane switching mode liquid crystal display device according to an embodiment of the presenting invention.
Figure 4:
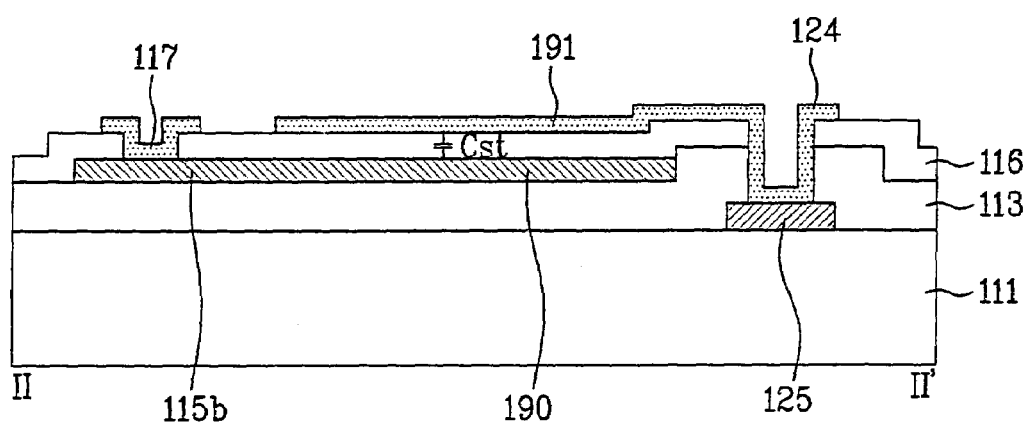
FIG. 4 a cross-sectional view taken along line II-II' of FIG. 3.

FIG. 3 is a plan view illustrating a pixel unit of the in-plane switching mode liquid crystal display device according to an embodiment of the present invention, and FIG. 4 a cross-sectional view taken along line II-II' of FIG. 3.

As shown in FIGS. 3 and 4, the in-plane switching mode liquid crystal display device in the illustrated embodiment includes a thin film transistor array substrate having a plurality of gate lines 112 arranged in line and a plurality of data lines 115 intersecting at right angles to the gate lines 112. Each pixel unit is defined by the gate line 112 and the data line 115. At each pixel unit are disposed a thin film transistor (TFT) serving as a switching element, a common lines 125 arranged in parallel with the gate lines 112 such that a common voltage signal Vcom is transmitted to the common line 125 from the outside of the active region, a plurality of common electrodes 124 connected to the common line 125 via a second contact hole 182 such that the Vcom signal is transmitted through the common electrodes 124, a plurality of pixel electrodes 117 connected to a drain electrode 115b of the thin film transistor (TFT) via a first contact hole 181, while being in parallel with the common electrodes 124, for generating a transversal electric field, a lower capacitor electrode 190 extending from the drain electrode 115b, and an upper capacitor electrode 191 extending from the common electrodes 124. The upper capacitor electrode 191 overlaps with the lower capacitor electrode 190.

The gate lines 112 and the common lines 125 are formed on the same layer. The gate lines 112 and the common lines 125 are made of an opaque metal material, such as copper (Cu), aluminum (Al), aluminum neodymium (AlNd), molybdenum (Mo), chrome (Cr), titanium (Ti), tantalum (Ta), or molybdenum-tungsten (MoW). The common electrodes 124 and the pixel electrodes 117 are also formed on the same layer. The common electrodes 124 and the pixel electrodes 117 are made of a transparent conductive material, such as indium tin oxide (ITO) or indium zinc oxide (IZO).

A gate insulation film 113 having a thickness of about 4000 Å between the gate lines 112 and the data lines 115 is formed. A protective film 116 having a thickness of about 500 to 2500 Å, preferably about 1500 to 2000 Å, is formed between the data lines 115 and the common electrodes 124. The gate insulation film and the protective film are made of an inorganic insulation material, such as silicon nitride (SiNx) or silicon oxide (SiOx), which is, for example, deposited by plasma enhanced chemical vapor deposition (PECVD).

Consequently, the storage capacitor in the illustrated embodiment comprises the lower capacitor electrode 190 extending from the drain electrode 115b such that pixel voltage is applied to the lower capacitor electrode 190, the upper capacitor electrode 191 extending from the common electrodes 124, while overlapping with the lower capacitor electrode 190, such that the Vcom signal is applied to the upper capacitor electrode 191, and the protective film 116 disposed between the lower capacitor electrode 190 and the upper capacitor electrode 191. The protective film is formed to a thickness of about 500 to 2500 Å, preferably about 1500 to 2000 Å. Therefore, the storage capacitance is considerably increased as compared to the conventional storage capacitor. In the illustrated embodiment, the thickness of the insulation film disposed between the upper and lower capacitor electrodes is at most half of the conventional storage capacitor. Therefore, the storage capacitance is doubled or more.

In this way, the storage capacitance is increased, and therefore, the area of the capacitor electrode can be relatively reduced. Consequently, the aperture ratio of the pixel unit section can be increased.

The upper capacitor electrode 191 may be integrally formed with the common electrodes 124, or may be formed as an additional independent pattern on the same layer on which the common electrodes 124 is located. In the case that the upper capacitor electrode 191 is formed as the independent pattern, the upper capacitor electrode 191 is connected to the common line 125, which is disposed below the upper capacitor electrode 191, via a third contact hole 183 such that the Vcom signal can be applied to the upper capacitor electrode 191.

In addition, the thin film transistor (TFT) comprises a gate electrode 112a at a predetermined region of the corresponding gate line 112, a gate insulation film 113 formed at the front surface including the gate electrode 112a, a semiconductor layer 114 formed on the gate insulation film 113 above the gate electrode 112a, and a source electrode 115a and a drain electrode 115b formed on the semiconductor layer 114 while diverging from the corresponding data line 115.

Although not shown, a color filter array substrate, which has a black matrix, a color filter layer, and an overcoat layer, is attached to the thin film transistor array substrate while the color filter array substrate is opposite to the thin film transistor array substrate. A liquid crystal layer is disposed between the color filter array substrate and the thin film transistor array substrate.

First and second polarizing plates are attached to the outer circumferential surfaces of the thin film transistor array substrate and the color filter array substrate, which are attached to each other while being opposite to each other as described above, respectively. The transmission axes of the first and second polarizing plates are perpendicular to each other. The initial alignment direction of the liquid crystal is in parallel with the transmission axis of any one of the polarizing plates such that the liquid crystal is in normal black mode.

In the illustrated embodiment of the present invention, the common electrodes and the pixel electrodes are arranged in line. However, the common electrodes and the pixel electrodes may be arranged in a zigzag type. Furthermore, all the technical ideas of the present invention can be applied to a fringe field switching (FFS) mode liquid crystal display device or a transflective mode liquid crystal display device in which the ITO electrode overlaps with the extension of the drain electrode while the thin protective film is disposed between the ITO electrode and the extension of the drain electrode.

In the liquid crystal display device of the illustrated embodiment, The extension of the drain electrode, the extension of the common electrode overlapping with the extension of the drain electrode, and the thin protective film disposed between the extension of the drain electrode and the extension of the common electrode constitute the storage capacitor. Consequently, the storage capacitance is increased as compared with the conventional art.

In the case of a high-resolution liquid crystal display device, the area of the opaque capacitor electrode is relatively reduced due to the increased storage capacitance. Therefore, the aperture ratio of the pixel unit section is improved.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   a thin film transistor formed on a substrate, the thin film transistor including a drain electrode, the substrate including:
   at least one pixel electrode connected to the drain electrode;
   at least one common electrode, the at least one pixel electrode and the at least one common electrode being formed on a same layer;
   a gate line and a data line disposed on the substrate to define a pixel, the thin film transistor being formed at an intersection of the gate line and the data line;
   a common line arranged in parallel with the gate line, the common line being connected to the at least one common electrode;
   a liquid crystal layer disposed between the substrate and a second substrate opposite to the substrate; and
   a storage capacitor connected to the drain electrode, the storage capacitor including:
   a lower capacitor electrode extending from the drain electrode;
   an upper capacitor electrode; and
   a protective film between the lower capacitor electrode and the upper capacitor electrode.

2. The device of claim 1, wherein the liquid crystal display device is an in-plane switching mode liquid crystal display device.

3. The device of claim 1, wherein the at least one pixel electrode and the at least one common electrode are alternately formed on the protective film.

4. The device of claim 1, wherein the at least one pixel electrode are parallel with the at least one common electrode.

5. The device of claim 1, wherein the lower capacitor electrode and the drain electrode are substantially coplanar.

6. The device of claim 1, further comprising a gate insulation film on the substrate.

7. The device of claim 6, wherein the lower capacitor electrode is above the gate insulation film.

8. The device of claim 6, wherein the storage capacitor is above the gate insulation film.

9. The device of claim 1, wherein the lower capacitor electrode is integrally formed with the drain electrode.

10. The device of claim 1, wherein the upper capacitor electrode extends from a common electrode.

11. The device of claim 10, wherein the upper capacitor electrode is integrally formed with the common electrode.

12. The device of claim 1, wherein the protective film is formed on top of the thin film transistor and the lower capacitor electrode.

13. The device of claim 1, wherein the protective film has a thickness of about 500 to 2500 Å.

14. The device of claim 1, wherein the protective film has a thickness of about 1500 to 2000 Å.

15. The device of claim 1, wherein the lower capacitor electrode has a pixel voltage and the upper capacitor electrode has a common voltage.

16. A liquid crystal display device comprising:
a thin film transistor formed on a substrate, the thin film transistor including a drain electrodes, the substrate including:
at least one pixel electrode connected to the drain electrode, the at least one pixel electrode and at least one common electrode being formed on a same layer;
a gate line and a data line disposed on the substrate to define a pixel, the thin film transistor being formed at an intersection of the gate line and the data line;
a common line arranged in parallel with the gate line, the common line being connected to the at least one common electrode; and
a liquid crystal layer disposed between the substrate and a second substrate opposite to the substrate; and
a storage capacitor connected to the drain electrode, the storage capacitor including;
a lower capacitor electrode;
an upper capacitor electrode extending from at least one common electrode; and
a protective film between the lower capacitor electrode and the upper capacitor electrode.

17. The device of claim 16, wherein the liquid crystal display device is an in-plane switching mode liquid crystal display device.

18. The device of claim 16, wherein the at least one pixel electrode and the at least one common electrode are alternately formed on the protective film.

19. The device of claim 16, wherein the at least one pixel electrode are parallel with the at least one common electrode.

20. The device of claim 16, wherein the lower capacitor electrode extends from the drain electrode.

21. The device of claim 16, wherein the lower capacitor electrode and the drain electrode are substantially coplanar.

22. The device of claim 16, further comprising a gate insulation film on the substrate.

23. The device of claim 22, wherein the lower capacitor electrode is above the gate insulation film.

24. The device of claim 22, wherein the storage capacitor is above the gate insulation film.

25. The device of claim 16, wherein the lower capacitor electrode is integrally formed with the drain electrode.

26. The device of claim 16, wherein the upper capacitor electrode is integrally formed with the common electrode.

27. The device of claim 16, wherein the protective film is formed on top of the thin film transistor and the lower capacitor electrode.

28. The device of claim 16, wherein the protective film has a thickness of about 500 to 2500 Å.

29. The device of claim 16, wherein the protective film has a thickness of about 1500 to 2000 Å.

30. The device of claim 16, wherein the lower capacitor electrode has a pixel voltage and the upper capacitor electrode has a common voltage.

* * * * *